OR RE 26,342

174247

Feb. 13, 1968 B. D. BEDFORD Re. 26,342

POWER CIRCUITS WHICH ARE INHERENTLY CAPABLE OF INVERTER OPERATION

Original Filed Nov. 13, 1962 6 Sheets-Sheet 1

Inventor
Burnice D. Bedford
by Charles W. Helzer
His Attorney

Inventor
Burnice D. Bedford
by Charles W. Helzer
His Attorney

Inventor:
Burnice D. Bedford,
by Charles W. Helzer
His Attorney.

Inventor:
Bernice D. Bedford,
by Charles W. Helzer
His Attorney.

Inventor:
Burnice D. Bedford,
by Charles W. Helzer
His Attorney.

Inventor:
Burnice D. Bedford,
by Charles W. Helzer
His Attorney.

United States Patent Office

Re. 26,342
Reissued Feb. 13, 1968

26,342

POWER CIRCUITS WHICH ARE INHERENTLY CAPABLE OF INVERTER OPERATION

Burnice D. Bedford, Scotia, N.Y., assignor to General Electric Company, a corporation of New York Original No. 3,303,406, dated Feb. 7, 1967, Ser. No. 237,065, Nov. 13, 1962. Application for reissue June 29, 1967, Ser. No. 651,641

42 Claims. (Cl. 321—44)

Matter enclosed in heavy brackets [ ] appears in the original patent but forms no part of this reissue specification; matter printed in italics indicates the additions made by reissue.

ABSTRACT OF THE DISCLOSURE

*A family of power circuits using a pair of conductivity controlled current switching devices interconnected in series circuit relationship with a tapped first linear inductor across a pair of power supply terminals that are adapted to be connected across a source of electric potential. A load circuit is operatively coupled across the power supply terminals in series circuit relationship with at least one of the pair of devices through a part of the tapped inductor. The circuits also include commutation circuit means formed by at least one commutating capacitor and series connected second linear inductor operatively connected between the tap point of the first inductor and at least one of the power supply terminals. The series circuit comprised by the commutating capacitor and second inductor is tuned to series resonance at a commutating frequency having a period which is substantially shorter than the load current conducting periods of the power circuit. With this arrangement, one of the pair of current switching devices is adapted to be intermittently conductive for discharging the commutating capacitor through the tapped first inductor and thereby terminating the conduction of the other of the pair of current switching devices. Bridge type power circuits comprising the same basic circuit configurations are also provided.*

This invention relates to new and improved inverter circuits.

More particularly, the invention relates to a new and improved family of relatively inexpensive, efficient inverter circuits using silicon controlled [reflectors] *rectifiers* to convert direct current electric energy into alternating current electric energy having a desired waveform.

With the introduction of the silicon controlled rectifier into industry as a readily available and reliable electric current controlling component, considerable effort has been expanded in devising inverter circuit configurations for converting direct current electric energy to alternating current having a desired waveform. While there are a number of inverter circuits available to the industry, many of these available circuits have operating characteristics which make them suitable for use only in certain situations. For other applications, these known inverter circuits are not too satisfactory because their higher cost cannot be justified, relative inefficiency, lack of flexibility, or adaptability to particular operating conditions, and other similar objections.

It is, therefore, a primary object of the present invention to provide a new and improved family of general purpose inverter circuits which are relatively inexpensive to manufacture and efficient in operation.

In practicing the invention, a new and improved inverter circuit is provided which includes a pair of gate controlled unidirectional conducting devices, which are preferably silicon controlled rectifiers, and which are interconnected with a commutating interval current limiting reactor in circuit relationship. The circuit thus formed is adapted to be connected across a source of direct current electric potential. A series circuit comprised by at least one commutating capacitor and series connected second inductor is operatively connected through alternate ones of the unidirectional conducting devices to the source of direct current electric energy in a manner such that the capacitor is charged to a predetermined energy level during the periods of conduction of at least one of the gate controlled unidirectional conducting devices, and discharge of the commutating capacitor during commutating periods will reverse bias the gate controlled unidirectional conducting device to cause it to turn off. The series circuit comprised by the commutating capacitor and the second inductance is tuned to series resonance at a commutating frequency substantially higher than the operating frequency of the inverter. An additional unidirectional conducting device, such as a diode is connected in parallel circuit relationship with each of the gate controlled unidirectional conducting devices for circulating the excess reactive energy stored in the commutating capacitor during the commutating periods of the gate controlled unidirectional conducting devices. Additionally, auxiliary circuit means may be coupled to the commutating interval current limiting reactor for circulating the energy stored therein during the commutating periods of the gate controlled unidirectional conducting devices. In a preferred embodiment of the invention, the commutating interval current limiting reactor comprises a center tapped winding wherein the two winding halves are tightly coupled so that equal currents flowing in opposite directions in the winding halves produce ampere turn effects which cancel each other out. To complete the circuit, a load is coupled to the unidirectional conducting devices through the commutating interval current limiting reactor, and a gating signal source is operatively coupled to the gating electrodes of the gate controlled unidirectional conducting devices for gating on these devices in a manner to produce a desired output waveform.

Other objects, features, and many of the attendant advantages of this invention will be appreciated more readily as the same becomes better understood by reference to the following detailed description when considered in connection with the accompanying drawings, wherein like parts in each of the several figures are identified by the same reference character, and wherein.

Figure 1:
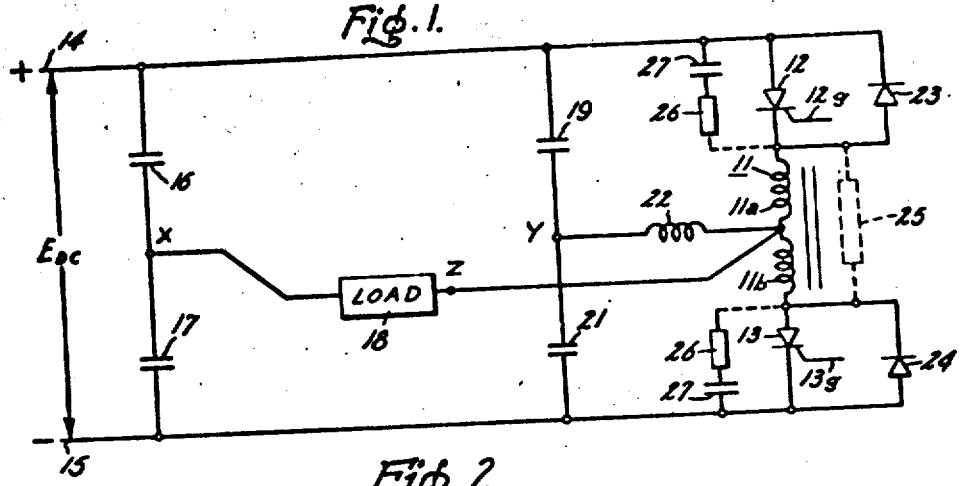
FIGURE 1 is a detailed circuit diagram of a new and improved, single phase inverter circuit constructed in accordance with the invention.

The new and improved inverter circuit illustrated in FIGURE 1 of the drawing includes a commutating interval current limiting reactor comprised by a center tapped winding 11 formed of two winding halves 11a and 11b, with the two winding halves 11a and 11b being tightly coupled, and precisely matched for a reason which will be better appreciated hereinafter. The center tapped winding 11 is connected in series circuit relationship with a pair of gate controlled unidirectional conducting devices 12 and 13 which actually comprise silicon controlled rectifiers. Silicon controlled rectifiers are now well known in the industry, and have been adequately described in the literature. Hence, no further identification of their characteristics is believed required other than to state that they comprise essentially a solid state version of a grid controlled gas discharge device wherein conduction through the device can be initiated by the application of a gating signal to the gating control electrode of the device, but thereafter the gating electrode loses control over conduction through the device and its anode or collector potential must be reduced relative to the cathode or emitter potential in order to turn the device off. For a further description of the construction and operation of silicon controlled rectifiers, reference is made to the Silicon Controlled Rectifier Manual, Second Edition, published by the Rectifier Components Department of the General Electric Company, West Genesee Street, Auburn, New York, copyright 1961, a copy of which can be obtained from the above identified Department of the General Electric Company.

In the inverter circuit of FIGURE 1, the silicon controlled rectifiers 12 and 13 are connected in front to back series circuit relationship through the center tapped winding 11, with the series circuit thus comprised being connected across the terminals 14 and 15 of a direct current power supply, not illustrated. Connected in parallel circuit relationship across the direct current power supply with the series circuit comprised by the center tapped winding 11 and the silicon controlled rectifiers 12 and 13, are a pair of series connected voltage dividing capacitors 16 and 17 whose center tap point is connected through a suitable load 18 to the center tap point of the center tapped winding 11. Also connected in parallel circuit relationship with the series circuit comprised by center tapped winding 11 and two silicon controlled rectifiers 12 and 13 are a pair of series connected commutating capacitors 19 and 21 whose center tap point is connected through a second inductance 22 to the center tap point of the center tapped inductance 11. To complete the circuit, additional unidirectional conducting devices comprised by diodes 23 and 24 are directly connected across each of the silicon controlled rectifiers in parallel circuit relationship with respective ones of the silicon controlled rectifiers. Further it is anticipated that a suitable gating signal source (not shown) will be coupled to the control gates 12g and 13g of the SCR's 12 and 13, respectively for turning the SCR's on and off in a manner to provide a desired output waveform. For a description of suitable gating circuits for this purpose, reference is made to chapter 4 of the above identified SCR Manual.

In operation, at frequencies which are low with respect to the commutating frequency, *the* new and improved inverter circuit functions in the following manner: It is assumed that the silicon controlled rectifier 12 is conducting and that the silicon controlled rectifier 13 is in a turned off state. Under these conditions, load current will be supplied through the silicon controlled rectifier 12 to the load 18, and the commutating capacitor 21 will be charged to the full value of the direct current supply potential $E_{DC}$. If under these conditions, a gating on signal is supplied to the gating electrode 13g of the silicon controlled rectifier 13, and concurrently a turn off signal is applied to the gating electrode 12g of the silicon controlled rectifier 12, the SCR 13 will be rendered conductive, and at the same instant the SCR 12 will continue to conduct since the turn-off signal applied to the gating electrode 12g will have no effect on conduction through the SCR 12 but is applied merely for insurance purposes to assure that upon the SCR 12 being turned off, it will remain off. At this instant of time, both SCR's 12 and 13 will be conducting so that the full line potential $E_{DC}$ is applied across both winding halves of the center tapped winding 11. As stated previously, the two winding halves 11a and 11b of the center tapped winding 11 are exactly matched so that in effect at their center tap point the potential will be one half $E_{DC}$. In other words, the potential applied to the terminal Z of load 18 is equal exactly to the potential $E_{DC}/2$ applied to the remaining terminal X of the load 18 thereby assuring that no further load current is supplied to the load 18 and its value drops to zero. Since the commutating capacitor 21 was charged to the full value $E_{DC}$ of the direct current power supply, it now discharges through the inductor 22 into the center tap of the center tapped winding 11 where it splits, half the commutating current $i_c/2$ going through the winding half 11a and SCR 12, and the remaining half of the commutating current $i_c/2$ going through the winding half 11b and SCR 13. As previously stated, the center tapped inductance 11 is exactly matched and closely coupled so that the ampere turns flowing in the winding half 11a due to the commutating current $i_c/2$ cancels out the ampere turns flowing in the winding half 11b due to the commutating current $i_c/2$, and as a consequence the center tapped winding 11 does not look like an inductance to the commutating current. The commutating current flowing in the upper winding half 11a opposes the load current flowing through the silicon controlled rectifier 12 so that the net current through the rectifier drops to zero, and the excess commutating current will flow through the diode 23 back into the commutating capacitor 19 to initiate charging of the commutating capacitor 19 to condition it for the next commutating cycle when it is required for the SCR 13 to be turned off. The commutating current flowing in the lower half winding 11b is supplied through the SCR 13 and back into capacitor 21. This current is in a direction to charge the capacitor 21 with a reverse polarity potential which conditions it for the next commutation cycle thereby greatly improving the efficiency of the circuit. Concurrently, with this action, the excess commutating current flowing through the diode 23 produces a reverse bias across the silicon controlled rectifier 12 which assures it being turned off. To facilitate this action, the second inductance 22, which together with the commutating capacitor 21 is series tuned to resonate at a commutating frequency which is substantially higher than the operating frequency of the inverter, but which allows the commutating current to build up sinusoidally for a period such that the initial sine wave pulse of commutating current exceeds the load current flowing through the SCR 12 for a period of time at least equal to the turn off time of the SCR 12, thereby causing the above mentioned turn-off action to occur. This commutating frequency may be in the neighborhood of from two to one (2:1) to anywhere as high as 50,000 or 100,000 to one (50,000:1; 100,000:1) depending of course on the operating frequency of the inverter and the turn off time of the SCR. It is to be understood that the ratios cited above are not limiting but are merely cited as exemplary.

During the commutation interval (the period $\Delta T$ shown in FIGURE 9b), an additional current $\Delta I$ will begin to build up at a constant rate due to the impressed direct current voltage $E_{DC}$ applied across the center tapped winding 11 which serves to limit the rate of increase of the direct current flowing through the circuit during this interval. For this reason, the winding 11 is referred to as a commutation interval current limiting reactor and is designed so that it exhibits a minimum practical impedance to the load current, while exhibiting a maximum practical impedance to the build up of the additional current $\Delta I$ during the commutating interval. The rate of build up of the commutation interval current $\Delta I$ is dependent upon the inductance of the center tapped winding 11, and upon the value of the voltage $E_{DC}$ as set forth by the expression $$\frac{di}{dt}=\frac{E_{DC}}{L_{11}}$$

At the end of the commutation interval $\Delta T$, this additional current will have the value $$\Delta I=\frac{E_{DC}}{L_{11}}\times\Delta T$$

Figure 9A:
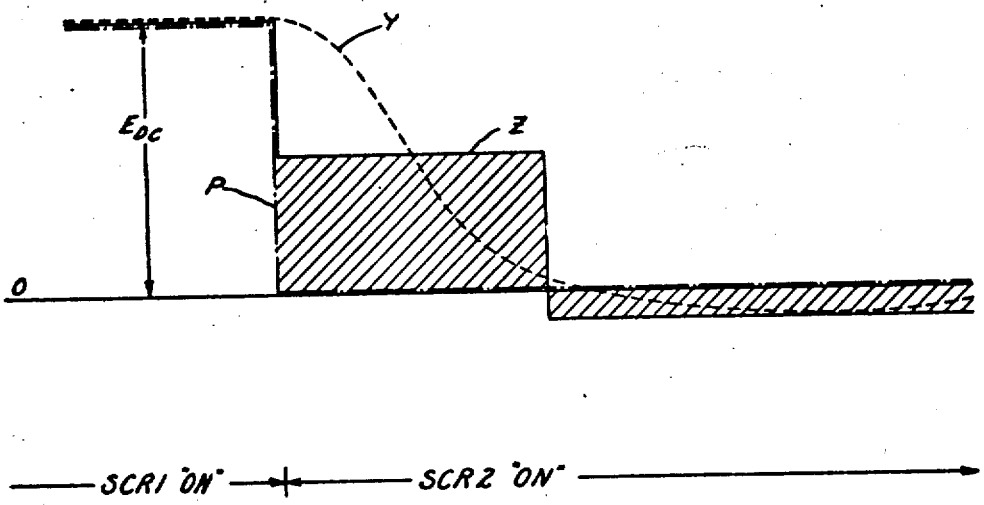
FIGURE 9a is a characteristic curve illustrating the voltage-time operating characteristics of the new and improved inverter circuits during commutation periods for a resistive load.
Figure 9B:
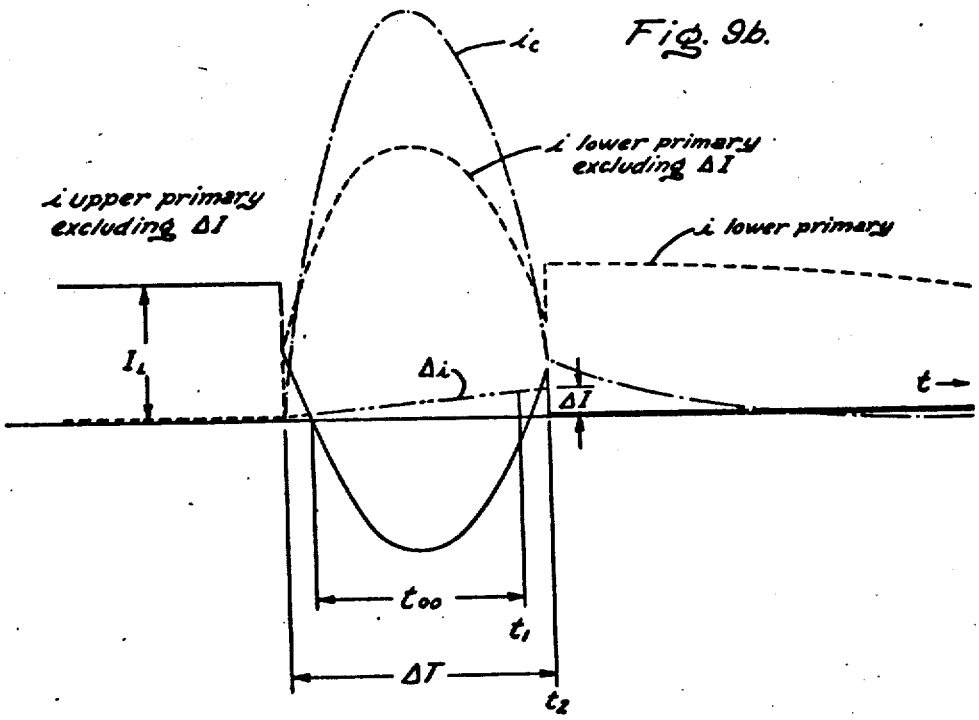
FIGURE 9b is a current v. time characteristic curve of the new and improved inverter circuits during the communicating period for resistive load conditions.

While the current and voltage wave shapes shown in FIGURES 9a and 9b are for those assuming a resistive load 18, it is to be understood that this additional commutation interval current $\Delta I$ will build up irrespective of the nature of the load.

Referring again to FIGURES 9a and 9b and assuming a resistive load 18, upon the commutating current $i_c$ shown in FIGURE 9b reaching a value equal to the load current $i_L$ plus twice the build up in commutating interval current ($2\Delta i$), current through the SCR 12 is reversed and cut-off commences. The commutating current $i_c$ continues to build up and maintains the reverse current through the SCR for a period equal to the cut off time of SCR 12. During this period, diode 23 is rendered conductive, and maintains the commutating current $i_c$ while SCR 12 is cut off and returned to its blocking condition. Also during this period the commutating current $i_c$ reaches a peak, and begins to decay sinusoidally toward zero until time $t_1$ where the net current in the upper winding is zero, and the diode 23 begins to block. A finite clean out time is required for the diode 23 to block completely, however, so the commutation operation will continue until such time $t_2$ that diode 23 blocks. It is assumed that the center tapped winding 11 has no leakage reactance for the purpose of this discussion, and that the current in the upper winding half 11a can be cut off instantaneously. Accordingly, at the instant that the diode 23 blocks, the flux level in the core of the center tapped winding 11 has built up from its precommutation level of $N_{11a}I_L$ to a level of $N_{11}\Delta I+N_{11a}I_L$, and upon the diode 23 blocking, the current that had been flowing in the upper winding half 11a has to be transferred to the lower winding 11b (or to a secondary winding as will be discussed later). At the instant that the diode 23 blocks, two major conditions must be satisfied upon the current being transferred to the lower winding half 11b.

The first of these conditions is due to Lenz's law which requires that the flux level in the inductance 11 must be maintained at the value $N_{11}\Delta I+N_{11a}I_L$, and the second condition requires that the commutating current $i_c$ flowing in the inductance 22 be maintained to complete the commutation interval. This latter current also serves to precharge the capacitor 21 to a level $E_{DC}$ to condition it for the next commutating interval. Accordingly, upon diode 23 blocking, the point Z drops from its mid-tap potential $E_{DC}/2$ to a potential that is determined by the requirements of Lenz's law as set forth above. For example, if the commutating interval current $\Delta I$ is very small, the voltage of point Z in effect will go to the negative D.C. potential; thereby assuming a condition where most of the effects of commutation are largely completed, and initiating a new half cycle of operation of the inverter. The stored energy in the inductance 22 and in the center tapped reactor 11 may cause a slight amount of oscillation of the voltage of point Z, but such oscillation will die out due to the damping effect of the resistive load 18.

If in contrast to the above defined condition, the commutating interval current $\Delta I$ is sizeable compared to load current, the load current $i_L$ will assume a value which will satisfy the condition required by Lenz's law cited above. Under these circumstances, the voltage of point Z at time $t_2+$ will fall to a potential more negative than the value of the negative terminal of the direct current power supply $E_{DC}$. Subsequently, as the commutating interval current $\Delta I$ decreases to zero, the potential of the point Z will fall toward the value of the negative terminal of the direct current power supply $-E_{DC}$ allowing the load current $i_L$ to build back up to satisfy the requirements of Lenz's law. Upon reaching this condition, the voltage of point Z goes to the potential of the negative D.C. supply, and assumes a condition where the effects of commutation are largely completed, and initiates a new half cycle of operation. Again, if the commutating interval current $\Delta I$ is not too great with respect to load current, the voltage of point Z may oscillate due to the energy stored in the inductance 22 and reactor 11, but will be damped out by the effects of the resistive load.

In the event that commutating interval current $\Delta I$ is even larger compared to the load current, the potential at the point Z will tend to fall to a value considerably below the negative terminal of the direct current power supply $E_{DC}$. To prevent this condition, a resistor shown in dotted lines at 25 can be coupled across the center tapped inductance 11 in the manner shown for circulating the energy trapped in the inductance 11 so as to decrease the flux level in the reactance to the point such that the flux level in the core of inductance 11 drops to a value equal to that just prior to commutation (that is, equal to $N_{11a}\times I_L$). Upon this occasion, the core will be reset by the net ampere turns being reduced to a value such that the flux level in the core is determined primarily by the load current, and the voltage of the point Z goes to the potential of the negative terminal of the direct current power supply $-E_{DC}$; thereby assuming a condition where the major effects of the commutation are completed, and initiating a new half cycle of operation. There is another technique for meeting this problem which will be described with relation with the circuit shown in FIGURE 2 of the drawings, and which is probably a more satisfactory solution to the problem since dissipation of the energy stored in the center tapped winding 11 is not required, thereby improving the efficiency of the inverter.

Another circuit modification which may be employed with the basic inverter circuit of FIGURE 1 for protective purposes to limit the rate of rise of reapplied voltage across the silcon controlled rectifiers 12 and 13 is the inclusion of a series connected resistor 26 and capacitor 27 shown in dotted lines as being connected in parallel with the silicon controlled rectifiers 12 and 13. This resistance-capacitance network provides a path for the current at the instant that the diodes 23 and 24 block so as to reduce the induced voltage due to leakage inductance. Other schemes are available for this purpose, but will not be described since such techniques are well known in the art. The price paid for this protective feature, in addition to the added components, is the loss of energy in the resistor 26. This loss may not be serious at low frequencies, but as the inverter frequency is increased, the losses may become significant and may present heating problems in addition.

Figure 2:
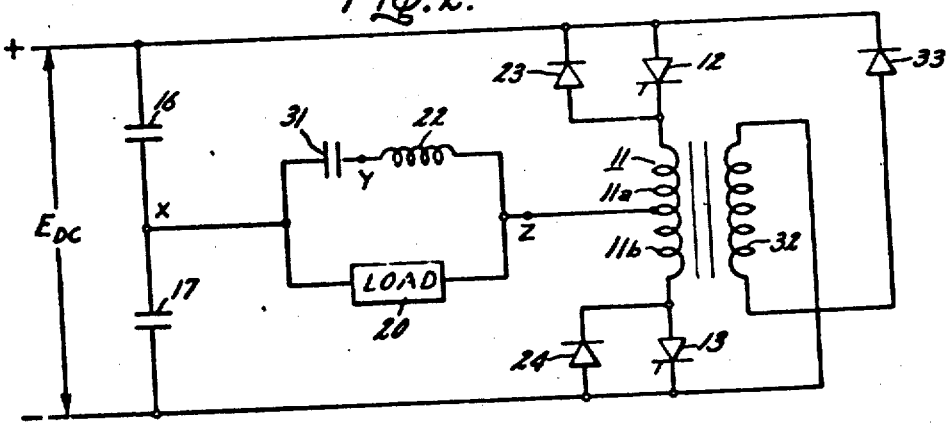
FIGURE 2 is a detailed circuit diagram of a second form of the new and improved single phase inverter circuit constructed in accordance with the invention and which is preferred for use in connection with inductive loads.

A second embodiment of the invention suitable for use as a single-phase inverter is shown in FIGURE 2 of the drawings. The embodiment of the invention shown in FIGURE 2 is similar in almost all respects to the circuit shown in FIGURE 1. One major difference is that a common commutating capacitor 31 is used in place of the two commutating capacitors 19 and 21 of the circuit shown in FIGURE 1. For this reason like parts in each of the two circuits have been given the same reference character. In the circuit shown in FIGURE 2 the common commutating capacitor 31 is connected in series circuit relationship with the second inductance 22, with the series circuit thus formed being series tuned to resonate at a commutating frequency which is substantially higher than the operating frequency of the inverter as was explained in connection with the circuit shown in FIGURE 1. The load 18 is connected in parallel circuit relationship with the series circuit comprised by the commutating capacitor 31, and second inductance 22 between the mid-tap points of the center tapped winding 11 and the two voltage dividing capacitors 16 and 17. The second major difference is the inclusion of a secondary winding 32 inductively coupled to the center tapped winding 11. The secondary winding 32 is connected in series circuit relationship with a blocking diode 33. The series circuit formed by secondary winding 32 and diode 33 is connected in parallel with the series circuits comprised by the center tapped winding 11 and the two series connected silicon controlled rectifiers 12 and 13.

The embodiment of the invention shown in FIGURE 2 is preferred for use in conjunction with inductive loads since it is better able to cope with the reactive component of the load current stored in the load 20, as well as the excess energy built up during the commutating interval. This feature is obtained by the inclusion of the secondary winding 32 and blocking diode 33 which, of course, could be incorporated into the embodiment of the circuit shown in FIGURE 1 in place of the resistor 25. Fabrication of the circuit to include this feature allows excess energy drawn from the power supply during commutation, to be recirculated back into the power supply, thereby conserving the energy, and greatly improving the efficiency of the inverter. In operation at frequencies which are low, with respect to the commutating frequency, the commutating capacitor 31 will be charged to substantially half the value of the direct current power supply $E_{DC}$ during each cycle of operation of the controlled rectifier 12 or 13. For example, if the SCR 12 is conducting, commutating capacitor 31 will be charged so that the point Y is positive with respect to the point X to half the value of the direct current power supply $E_{DC}$. If at this point the SCR 13 is gated on by the gating signal source while a turn off signal is applied to the gating electrode of the SCR 12, the commutating current $i_c$ will flow out of the commutating capacitor 31 and through both winding halves 11a and 11b of the center tapped inductance 11 in opposite directions to turn off the SCR 12 in the manner described with relation to the circuit shown in FIGURE 1. Similarly, because the full value of the direct current power supply $E_{DC}$ is supplied across the winding 11, an additional current $$\Delta I = \frac{E_{DC}}{L_{11}} \times \Delta T$$

will be built up during the commutating interval in the manner described with relation to the circuit shown in FIGURE 1. Here again, this additional current $\Delta I$ is minimized because the reactor 11 is designed to exhibit a minimum practical impedance to the load current while exhibiting a maximum practical impedance to the build up of the additional current $\Delta I$ during the commutating interval.

Figure 10A:
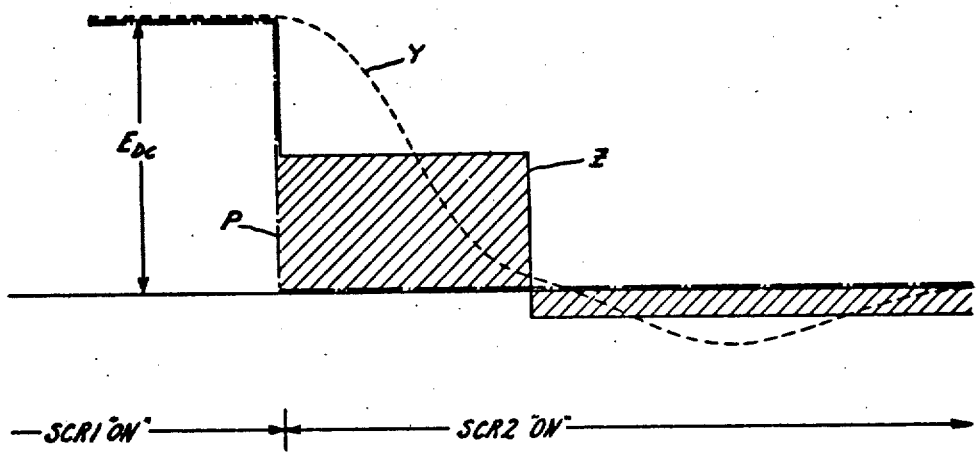
FIGURE 10a is a characteristic curve illustrating the voltage-time operating characteristics of the new and improved inverter circuit for inductive load conditions.
Figure 10B:
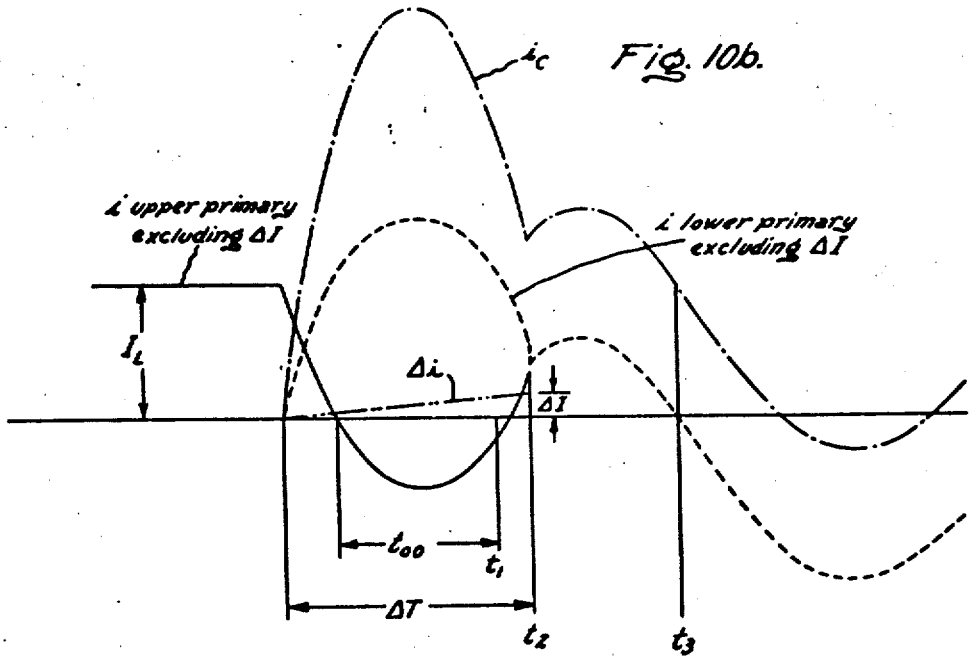
FIGURE 10b illustrates the current v. time characteristics of the new and improved inverter circuits with inductive loads.

The operation of the inverter circuit with an inductive load represents the most severe condition presented for commutation since with an inductive load it is necessary that the commutation current not only perform the operation of turning off the SCR (as in the resistive and no-load situations), but in addition it must supply current to the load during a portion of the commutation interval. This is caused by the nature of the inductive load. FIGURE 10a and FIGURE 10b illustrate the pertinent voltage and current wave forms obtained during the commutation interval with the circuit shown in FIGURE 2 of the drawings. In FIGURE 10b it can be seen that at the start of the commutation interval, the load current $I_L$ is supplied to the load. As the commutation current $i_c$ begins to build up from zero, $i_c$ flows into the load decreasing the amount of the current required from the SCR 12. At one point, the current $i_c$ is just equal to the load current $i_L$, so that the load requires no current from the SCR 12, and the current through SCR 12 is reduced to one half the load current (neglecting $\Delta i$) and the current in the SCR 13 has built up to one half the load current so as to maintain the flux level in the center tapped winding 11 in accordance with the requirements of Lenz's law. As the commutation interval continues, the commutating current $i_c$ builds up until $i_c$ equals twice the load current $i_L$, plus the build up in commutating interval current $\Delta i$, at which point current in SCR 12 is reversed, and cut-off commences. The commutating current $i_c$ continues to build up and maintains the reverse current through the SCR for a period equal to the cut off time of SCR 12. During this period, diode 23 is rendered conductive and maintains the commutation current while the SCR 12 is turned off, and returned to its blocking condition. Also during this period, the commutating current $i_c$ reaches a peak and starts to decay sinusoidally toward zero. At time $t_1$, the commutation current $i_c$ and the load current $i_L$ through the upper winding half 11a is equal to twice the build up current $\Delta i$ (i.e., $2\Delta i$) so that the diode 23 begins to block. At time $t_2$ the diode 23 has completely blocked so that the load current $i_L$ is now flowing entirely through the lower branch 11b. At time $t_2$ the current which flows through the lower winding half 11b is determined by the difference between the commutating current $i_c$ and the load current $i_L$ that has built up, since both of these currents must be maintained when the diode 23 blocks due to the inductances in each path in accordance with the requirements of Lenz's law. It may be seen in FIGURE 10b that the current through the lower winding 11b at time $t_2$ is less than $I_L$. At the point of time just prior to commutation, the flux level built up in the center tapped winding 11 was equal to $N_{11a} \times I_L$, and since there has been a net increase of flux due to the build up of the commutating interval current $\Delta I$ during the period $\Delta T$, it is necessary that the secondary winding 32 conduct in order to maintain the flux level of the center tapped winding 11. For this to happen, the potential of the point Z must drop below the value of the negative terminal of the direct current power supply in order to render diode 33 conductive. With the potential of point Z below the negative terminal of the direct current power supply, the voltage between the points X and Z is increased, thereby allowing more commutating current $i_c$ to be drawn from the commutating capacitor 31. This occurs between the intervals $t_2$ and $t_3$. This additional current also flows in the lower winding half 11b and builds up to a maximum before it begins to sinusoidally decay back towards zero at a frequency which is approximately the same as the frequency of commutation since only the leakage inductance of the lower winding is seen when the secondary winding 32 is conducting. At the instant the commutating current $i_c$ reaches the value $I_L$ and begins to decrease below that value, the energy stored in the load inductance 18 begins to supply current through the return diode 24 back through the lower winding half 11b into the load. This flow of current in the reverse direction through the lower winding half 11b requires that the secondary winding 32 conduct even more current than before in order to maintain the flux level of the center tapped winding 11. For this reason, the diode 33 will remain conducting until the core of the center tapped inductance 11 has been reset by the net ampere turns being reduced so that the flux level in the core is determined primarily by load current. Once the core has been reset, the major effects of commutation are completed and the load current flows to the load through the return diode 24. This current decreases linearly with time as shown in FIGURE 10b until the energy in the load inductance is exhausted, at which point the current then reverses and begins to flow through the silicon controlled rectifier 13 building up during the next half cycle of operation of the inverter until the next commutating period. From the above discussion it can be appreciated that the after effects of commutation mentioned briefly in connection with the resistive load case are quite pronounced in the case of an inductive load. As discussed previously, a resistive load tends to dampen the oscillatory current which results when the diode 23 or 24 blocks, and the additional stored capacitor energy in the commutating capacitor is being discharged. In the inductive load case, this oscillation becomes more severe than for the resistive load case due to the additional trapped energy in the circuit components resulting from the inductive load current.

Figure 11A:
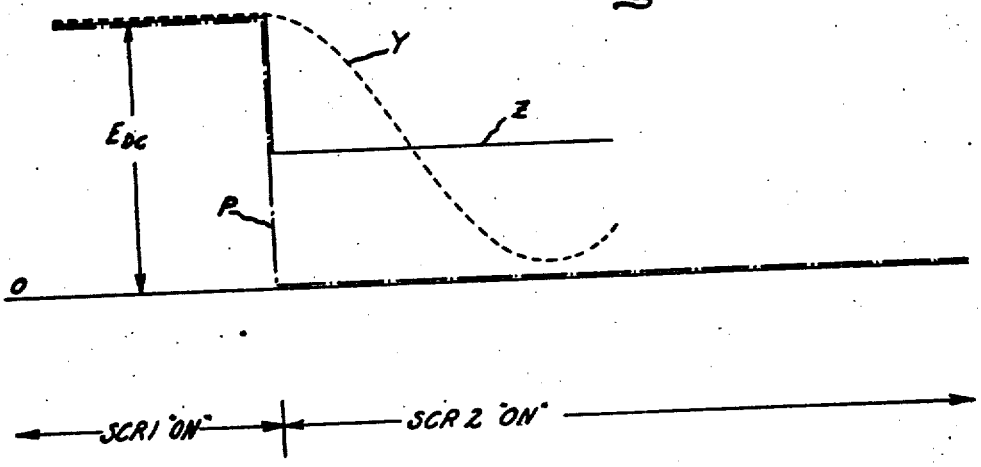
FIGURE 11a is a voltage v. time characteristic curve for the new and improved inverter circuits operating with capacitive loads.
Figure 11B:
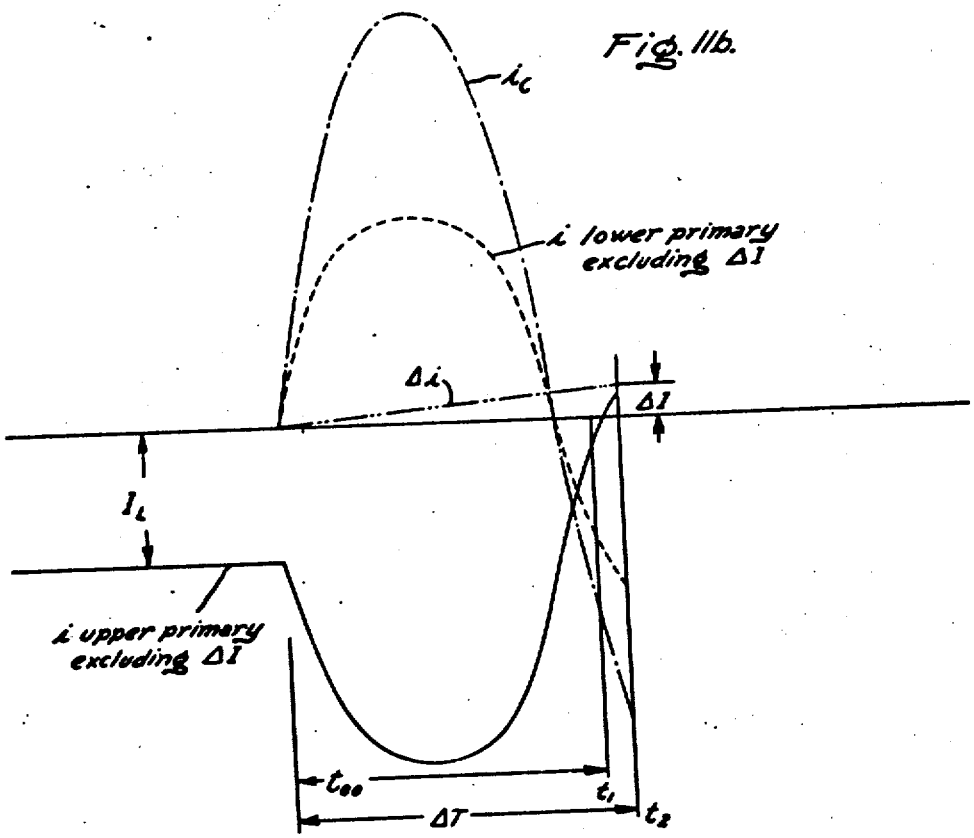
FIGURE 11b is a current v. time characteristic curve for the new and improved inverter circuits operating with capacitive loads.

As shown in FIGURES 11a and 11b of the drawing, operation of the new and improved inverter circuit with a capacitive load is somewhat similar to no-load operation of the inverter. Because of the leading load factor caused by the capacitive load, the load current will be flowing through the return diode 23 just prior to commutation, assuming that the circuit is in the condition where the SCR 12 is in a condition such that if the polarity of the potentials across it were correct, it would conduct, and SCR's are turned off. Upon initiating the commutation cycle by turning on SCR 13, the commutation current $i_c$ will flow up through the return diode in winding half 11a adding to the load current, and the other half of the commutation current $i_c$ flows through the lower winding half 11b and SCR 13 in the usual manner. In this case the commutation current $i_c$ flowing in the upper winding half 11a and return diode 23 is redundant since the silicon controlled rectifier 12 was already back-biased due to the leading load current through the return diode 23 just prior to commutation. As shown in FIGURE 11b, the net current in the upper winding half 11a is not reduced to zero until time $t_1$ when the current in the upper winding half 11a is just equal to the build up current $\Delta I$. At this point the return diode 23 will begin to block, thereby completing the commutation interval. Prior to this occasion, the SCR 12 has, of course, been turned off due to the back-biasing effect of the return diode 23 upon conduction through the SCR 13 having been initiated. It should be noted that the commutation interval $\Delta T$ in the case of the capacitive load is increased considerably over that observed with other load conditions.

Figure 3:
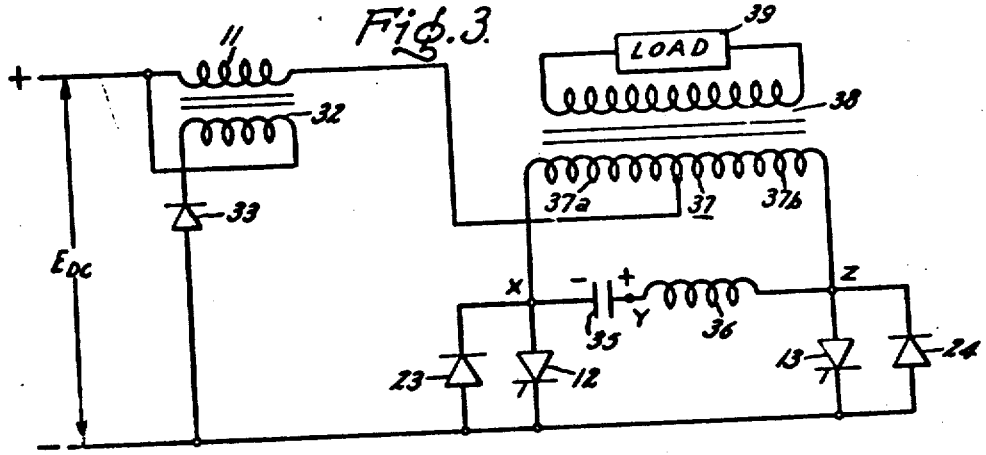
FIGURE 3 is a detailed circuit diagram of still a third form of the new and improved, single phase, half wave inverter circuit constructed in accordance with the invention, and which is preferred for use with low voltage direct current power supply.

The embodiment of the invention shown in FIGURE 3 of the drawings is somewhat different from the single phase inverter circuits shown in FIGURES 1 and 2 in that the emitter electrodes of both silicon controlled rectifiers 12 and 13 are coupled to the negative terminal of the direct current power supply $E_{DC}$ in common, with the collector electrodes of the SCR's being connected to the ends of respective winding halves 37a and 37b of center tapped winding 37. The center tapped point of the center tapped winding 37 is connected through a commutating interval current limiting reactor comprised by a primary winding 11, to the positive terminal of the direct current power supply $E_{DC}$. The commutating interval current limiting winding 11 is inductively coupled to a secondary winding 32 connected in series with a blocking diode 33 across the direct current power supply $E_{DC}$. A commutating capacitor 35 is connected in series circuit relationship with a second inductance 36 between the collector electrodes of the silicon controlled rectifiers 12 and 13 with the series circuit thus comprised being tuned to series resonance at a commutating frequency which is substantially higher than the operating frequency of the inverter. Load current is supplied from the inverter circuit of FIGURE 3 through a secondary winding 38 that is inductively coupled to the center tapped winding 37 and that has a load 39 connected across it.

In operation, the circuit of FIGURE 3 functions in a manner similar to the circuits of FIGURES 1 and 2. Assuming the silicon controlled rectifier 12 is to be conducting and SCR 13 to be turned off, the commutating capacitor 35 will be charged so that the point X is at the potential of the negative terminal of the D.C. power supply $-E_{DC}$, and the point Y is charged to double the positive potential $+E_{DC}$o. Upon SCR 13 being turned on, the point Z will be connected to the same potential as the point X, and both points will in effect be at the same potential as the negative terminal of the direct current power supply $-E_{DC}$. The charges trapped in the commutating capacitor 35 upon this occurrence will flow through the SCR 13 and the SCR 12 reducing the load current through SCR 12 to zero, with the surplus commutating current flowing through the diode 23 to produce a reverse bias on SCR 12, and turn it off. On the alternate half cycles the reverse process takes place to commutate off the SCR 13. During the commutating interval the additional current $\Delta I$ built up during the commutating interval will flow into the center [top] *tap* point on the winding 37, split, and supply equal currents in opposite directions through the winding halves 37a and 37b. As a consequence, the ampere turn effects of these currents will cancel each other out, and the winding 37 will not appear as an impedance to this additional current. In order to prevent this additional current $\Delta I$ from increasing at too great a rate, the commutating interval current limiting reactor winding 11 is included in the circuit. This winding 11 is designed to exhibit a minimum practical impedance to the load current while exhibiting a maximum practical impedance to the build-up of the additional current $\Delta I$ during the commutating interval. Because the winding 11 does exhibit some impedance to the load current $I_L$, flux is built up in the core of the winding 11 during the load current carry interval as set forth in the expression $N_{11}I_L$. During the commutation interval, [Lenz] *Lenz's* law requires that this flux level be maintained until it is allowed to decay at a finite rate limited by the finite voltage of the direct current power supply. To satisfy this requirement the secondary winding 32 conducts, and recirculates the current induced therein by the flux change in winding 11, back into the D.C. power supply. In this manner, the energy associated with the flux in winding 11 is not dissipated but is conserved thereby improving the efficiency of the circuit while allowing the energy stored in winding 11 to decay at the above mentioned finite rate. Concurrently, the charge on the commutating capacitor 35 will oscillate around the series tuned circuit comprised by the commutating capacitor 35 and second inductance 36, recharging the capacitor 35 in a reverse polarity direction, and commutating off the SCR 12. Upon this occurrence, the potential of the point Z will go to the potential of the negative terminal of the direct current power supply $E_{DC}$, thereby completing the commutation interval, and initiating a new half cycle of operation.

Figure 4:
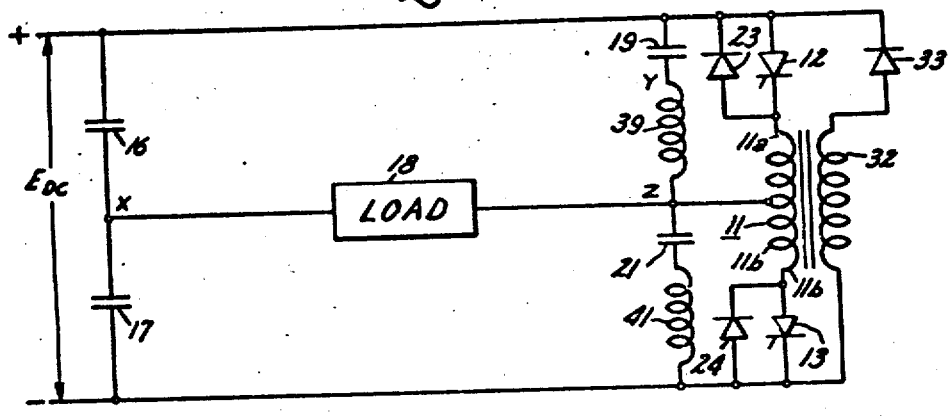
FIGURE 4 is a detailed circuit diagram of still a fourth version of the new and improved single phase inverter circuit constructed in accordance with the invention.

Still a fourth version of a single phase inverter circuit constructed in accordance with the invention is shown in FIGURE 4 of the drawings. The embodiment of the single phase inverter circuit shown in FIGURE 4 is similar in all respects to the inverter circuit illustrated in FIGURE 1 with the exception that the single inductor 22 of the FIGURE 1 circuit is replaced by two separate inductors 39 and 41 in the inverter of FIGURE 4. The inductor 39 and series connected capacitor 19 are tuned to series resonance at the commutating frequency of the inverter as also are the inductor 41 and the capacitor 21. Additionally, a secondary winding 32 is inductively coupled to the commutating interval current limiting reactor comprised by the center tapped winding 11, and is connected in series circuit with a blocking diode 33 across the direct current power supply. By this arrangement, the auxiliary circuit means comprised by winding 32 and diode 33 serves to feed back the excess reactive energy in the winding 11 to the direct current power supply in the manner described with relation to FIGURE 3 of the drawings. In all other respects, the circuit of FIGURE 4 operates in a fashion that is so similar to that described with relation to FIGURE 1 of the drawings, that it is believed unnecessary to again describe it in detail.

Figure 5:
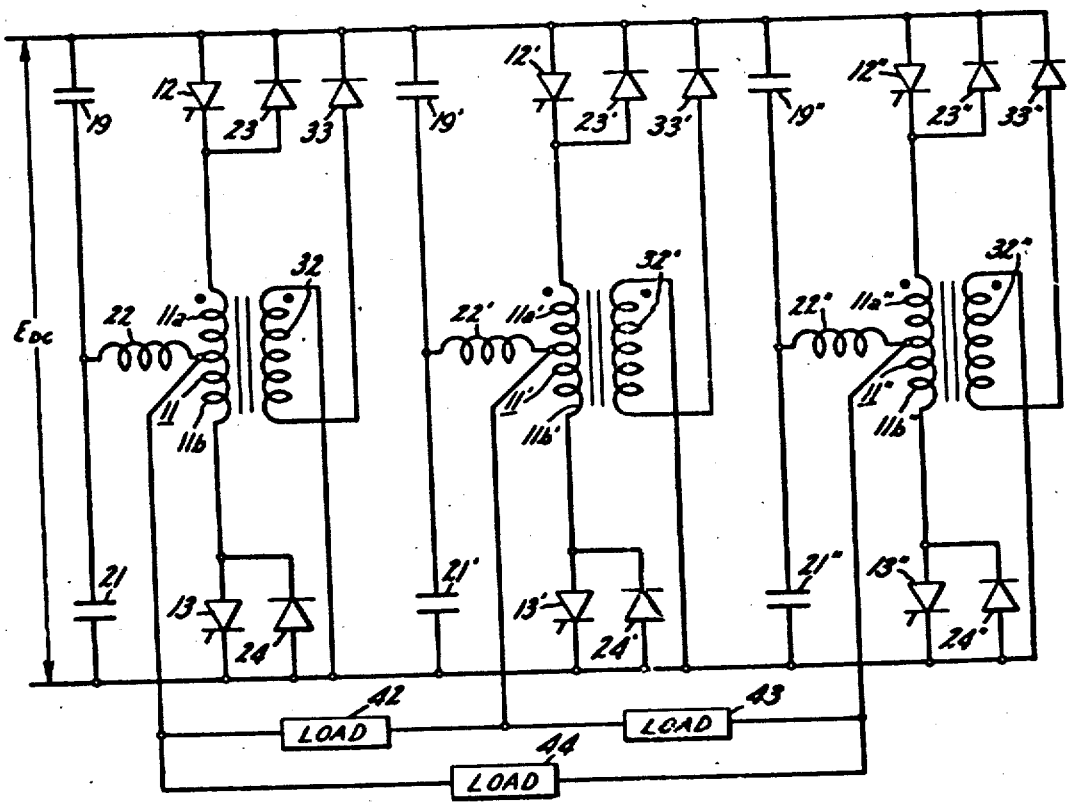
FIGURE 5 is a detailed circuit diagram of a three-phase inverter employing a commutating circuit similar to that of the single-phase inverter of FIGURE 1; and the inductively coupled feedback circuit of FIGURE 2.

A three-phase inverter circuit constructed in accordance with the present invention is shown in FIGURE 5 of the drawings. The three-phase inverter of FIGURE 5 is actually constructed from three single-phase inverters of the type shown in FIGURE 1 of the drawings, and, hence, each of the single-phase inverters has been identified with the same reference character employed in connection with the description of FIGURE 1 of the drawings. Because each of the three single-phase inverters employed in the FIGURE 5 circuit are constructed and operate in an essentially identical manner of that described in relation to FIGURE 1, they will not be again described in detail. The outputs of the three single-phase inverters are combined in a delta connected load circuit comprised by one load 42 being connected between the center tap points of the center tapped windings 11 and 11', a load 43 connected between the center tap points of the center tapped windings 11' and 11'', and a load 44 connected between the center tap points of the center tapped windings 11 and 11''. It would also be possible to combine the outputs in a Y connected load circuit with or without a neutral connected to ground, or with a neutral connection back to the neutral of the direct current power supply. By interconnecting the individual loads of the single phase inverters in any of the above manners, the outputs of the inverters can be combined to provide a three-phase optput. It is of course necessary that the timing of the gating-on and turn-off signals applied to the gating electrodes of the several SCR's be properly synchronized by the gating signal sources. For this reason, the gating signal source must be specially tailored for three-phase operation, in the manner of those illustrated, and described on pages 130 and 133 of the above described SCR manual.

Figure 6:
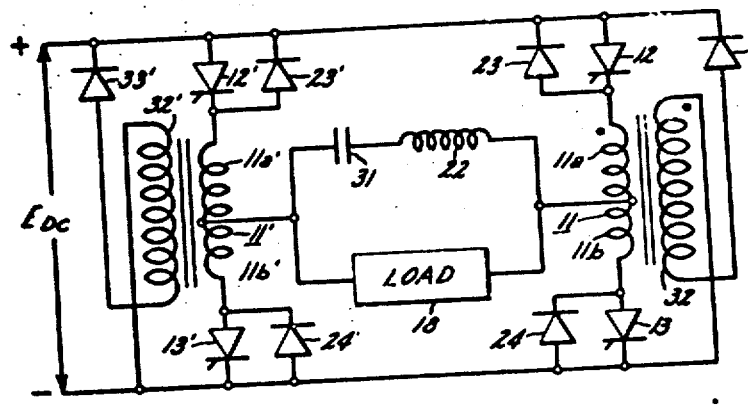
FIGURE 6 is a detailed circuit diagram of a full wave inverter constructed in accordance with the present invention, and which employs as a part thereof the single phase inverter of FIGURE 2.

A single-phase, full-wave bridge inverter constructed in accordance with the invention is shown in FIGURE 6 of the drawings. The full wave bridge inverter of FIGURE 6 employs two of the basic single-phase, full-wave inverter circuit arrangements of FIGURE 2 modified to provide full wave operation. To form the full-wave bridge inverter circuit of FIGURE 6, the voltage dividing capacitors 16 and 17 of the single-phase full-wave inverter of FIGURE 2 have been replaced with a second set of series connected silicon controlled rectifiers 12' and 13' and center tapped winding 11' shown on the left hand portion of the circuit as viewed by the reader. In operation, the full-wave bridge inverter of FIGURE 6 functions in essentially the same manner as two single-wave inverters, but must employ an appropriate gating signal source for providing gating signals to the gating electrodes of the silicon controlled rectifiers to achieve full wave operation. Because of the fact that the inverter of FIGURE 6 employs a common commutating capacitor 31, it is necessary that the SCR's be gated on and off in a closely controlled manner to avoid complications in the operation of the circuit.

Figure 7:
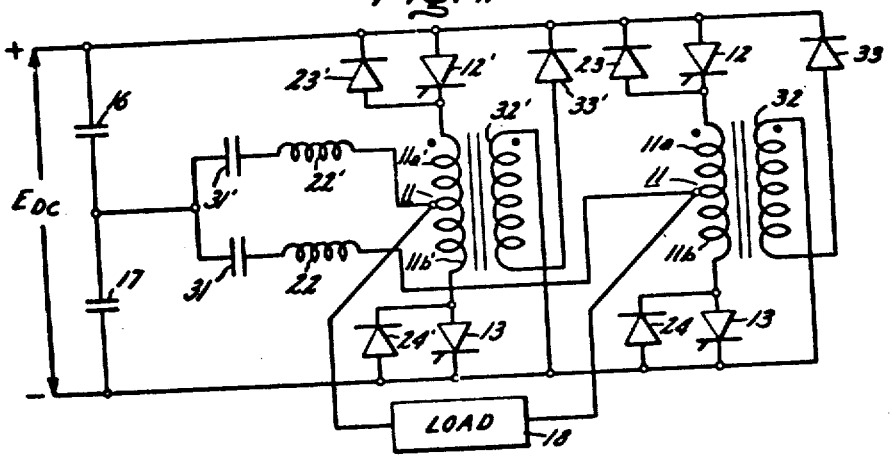
FIGURE 7 is a detailed circuit diagram of a modified version of the full wave inverter circuit of FIGURE 6.

In order to obviate the need for rigorous synchronization of the firing of the SCR's for the circuit shown in FIGURE 6 of the drawings, the full wave inverter of FIGURE 7 has been provided. The full wave inverter of FIGURE 7 is similar to the inverter of FIGURE 6 with the exception that two commutating circuits comprised by the commutating capacitor 31 and second inductance 22 and commutating capacitor 31' and second inductance 22' have been provided, in place of the single commutating circuit used in the embodiment shown in FIGURE 6. In the full wave bridge inverter of FIGURE 7, a pair of series connected voltage dividing capacitors 16 and 17 are connected across the direct current power supply $E_{DC}$ with the mid-point of the voltage dividing capacitors being connected through the series commutating circuit comprised by commutating capacitor 31 and second inductance 22 to the mid-tap point of the center tapped winding 11. Similarly, the center point of the voltage dividing capacitors 16 and 17 is connected through a second series commutating circuit comprised by the commutating capacitor 31' and series connected second inductance 22' to the center tapped point of the center tapped winding 11'. The load 18 to be supplied is connected between the center tap point of the two center tapped windings 11 and 11'.

In operation, the full wave bridge inverter of FIGURE 7 functions in an essentially similar fashion to two single-phase inverters of the type shown in FIGURE 2 of the drawings operated in a bridge inverter manner to provide a full wave output signal. Because separate commutating circuits are provided for each of the center tapped windings 11 and 11', it is no longer essential to so closely synchronize the turning on and turning off of the various silicon controlled rectifiers as was the case with the full wave inverter shown in FIGURE 6 of the drawings. It should be noted, however, that both the full wave inverters shown in FIGURE 6 and FIGURE 7 require a center tapped direct current power supply which increases the cost of the inverter somewhat. To obviate this need, a circuit such as that shown in FIGURE 8 of the drawings is provided.

Figure 8:
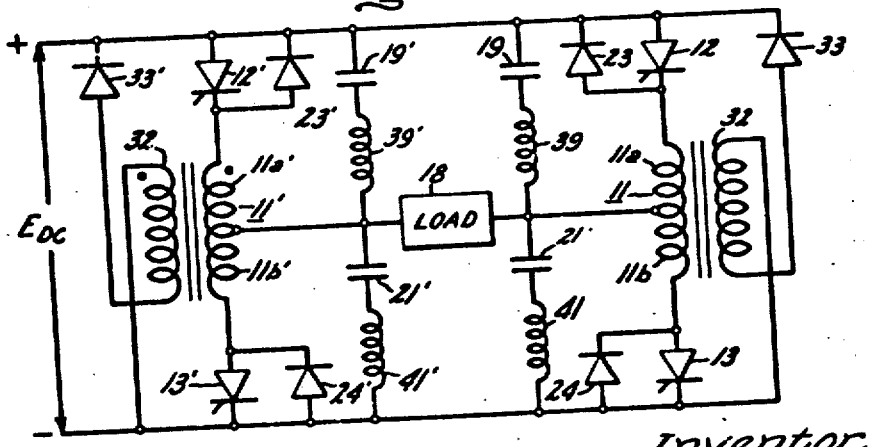
FIGURE 8 is a detailed circuit diagram of still a third form of full wave inverter circuit constructed in accordance with the present invention, but which does not require a center tapped direct current power supply, and which employs as its basic building block the single phase inverter shown in FIGURE 4 of the drawings.

The full wave bridge inverter shown in FIGURE 8 of the drawings is comprised by two single-phase inverters of the type shown in FIGURE 4 interconnected through a common load 18 to provide a full wave output. Because the full wave bridge inverter of FIGURE 8 is essentially no different in operation and construction from two single-phase inverters of the type illustrated and described with relation to FIGURE 4 of the drawings, the various parts of the circuit have been identified by the same reference numerals, and a further description of the construction and operation of the circuit is believed unnecessary. It should be noted, however, that the full wave bridge inverter of FIGURE 8 does not require a center tapped direct curent power supply even though it does require two additional inductances and two additional commutating capacitors.

It is believed obvious from an examination of FIGURES 6–8 that the gating signal sources used to gate on the various silicon controlled rectifiers will be somewhat more complex than those used with the single-phase inverters illustrated and described in connection with FIGURES 1–4. Suitable gating signal sources for use with full wave bridge inverters have been described heretofore in the literature (for example, see the above identified Silicon Controlled Rectifier Manual), and, hence, a detailed description of their construction and operation is believed unnecessary. Further with respect to circuits shown in FIGURES 7 and 8, because of the use of the individual commutation circuit branches in these circuits, it is possible to use these circuits in conjunction with a phase controlled gating signal source similar to those described in the above identified SCR Manual, to deliberately alter the phase relation of the firing of the SCR's in this circuit for voltage control purposes. Since such technique is well known in the control of bridge inverter circuits, a further description of the same is believed unnecessary.

It should be noted that in the foregoing description, it was assumed that the commutating frequency was substantially higher than the operating frequency. For the purpose of this paragraph, this relationship shall be defined as constituting the portion of the spectrum where a half period of the commutating frequency is no more than one tenth (1/10) a half period of the operating frequency. In the event that the inverter is designed to operate in a high frequency region where the commutating frequency is such that its half period extends from about one-half (1/2) to nine tenths (9/10) a half period of the operating frequency, the operation becomes more complex. In operating under these latter assumed conditions, the dissipation of the energy stored in the commutating interval curent limiting reactor will extend over a substantial portion (i.e. 1/2 to 9/10) of the operating half period. Accordingly, since the transients associated with commutation extend over a substantial portion of the operating half cycle, it is anticipated that the wave-shape of the output signal will not be quite so good as that which could be maintained while operating under other not so rigorous conditions.

From the foregoing description, it can be appreciated that the invention provides a new and improved family of general purpose inverter circuits which are relatively inexpensive because of the fact that it does not require additional silicon controlled rectifiers to commutate off the load current carrying rectifiers. Additionally, because the commutating energy stored in the commutating circuits of the inverter is recirculated and used to charge the commutating circuit in a reverse direction following each half cycle of operation, the efficiency of the new and improved inverter is comparatively high.

Having described several embodiments of the new and improved inverter circuits constructed in accordance with the invention, it is believed obvious that other modifications and variations of the invention are possible in light of the above teachings. It is, therefore, to be understood that changes may be made in the particular embodiments of the invention described which are within the full intended scope of the invention as defined by the appended claims.

What I claim as new and desire to secure by Letters Patent of the United States is:

1. A new and improved inverter including in combination a pair of gate controlled unidirectional conducting devices, a commutating interval current limiting reactor interconnected with the pair of gate controlled unidirectional conducting devices with the circuit thus formed being designed for connection across a source of direct current electric potential, a commutating circuit comprised by at least one commutating capacitor and series connected second inductor operatively connected through at least a portion of the commutating interval current limiting reactor and through alternate ones of the unidirectional conducting devices during periods of conduction of the same across the source of direct current electric energy whereby the commutating capacitor is charged to a predetermined energy level during periods of conduction of respective ones of said gate controlled unidirectional conducting devices, and means for gating on the non-conducting one of the gate controlled unidirectional conducting devices to discharge [of] the commutating capacitor and reverse bias the initially conducting one of said gate controlled unidirectional conducting devices to turn it off, the series circuit comprised by the commutating capacitor and second inductor being tuned to series resonance at a commutating frequency substantailly higher than the operating frequency of the inverter.

2. The combination set forth in claim 1 further characterized by an additional unidirectional conducting device directly connected across each of the gate controlled unidirectional conducting devices in parallel circuit relationship for circulating any excess reactive energy of the commutating capacitor during the commutating periods of the gate controlled unidirectional conducting devices.

3. The combination set forth in claim 1 further characterized by auxiliary circuit means operatively coupled to said commutating interval current limiting reactor for circulating the energy stored therein during the commutating period.

4. The combination set forth in claim 1 wherein the commutating interval current limiting reactor is a winding which is tapped at its midpoint with the two winding halves being tightly coupled so that equal currents flowing in opposite directions in the winding halves produce ampere-turn effects which cancel each other out.

5. The combination set forth in claim 1 further characterized by a load operatively coupled to the source of electric potential through said unidirectional conducting devices.

6. The combination set forth in claim 1 wherein said gate controlled unidirectional conducting devices comprise silicon controlled rectifiers.

7. The combination set forth in claim 1 wherein the gate controlled unidirectional conducting devices comprise silicon controlled rectifiers and wherein the commutating interval current limiting reactor is a winding which is tapped at its center point with the two winding halves being tightly coupled so that equal currents flowing in opposite directions in the winding halves produce ampere-turn effects which cancel each other out, and further characterized by auxiliary circuit means operatively coupled to said commutating interval current limiting reactor for circulating any excess energy stored therein during the commutating period, a load operatively coupled to the source of electric potential through said silicon controlled rectifiers, and an additional unidirectional conducting device directly connected across each of the gate controlled unidirectional conducting devices in parallel circuit relationship for circulating any excess reactive energy of the commutating capacitor during the commutating periods of the gate controlled unidirectional conducting devices.

8. The combination set forth in claim 2 wherein said gate controlled unidirectional conducting devices comprise silicon controlled rectifiers, and said additional unidirectional conducting devices comprise diodes.

9. A new and improved inverter including in combination a pair of silicon controlled rectifiers, a commutating interval current limiting reactor comprised by a center tapped winding interconnecting the pair of silicon controlled rectifiers in series circuit relationship, a pair of voltage dividing capacitors connected in series circuit relationship and adapted to be connected across a direct current source of electric energy in parallel circuit relationship with the series circuit comprised by the center tapped winding and silicon controlled rectifiers, a commutating capacitor and second inductance interconnected in series circuit relationship between the juncture of the voltage dividing capacitors and the center tap point on the center tapped winding, the commutating capacitor and second inductance being tuned to series resonance at a commutating frequency that is substantially higher than the operating frequency of the inverter, and a respective by-pass diode directly connected across each one of said silicon controlled rectifiers in parallel circuit relationship.

10. The combination set forth in claim 9 further characterized by auxiliary circuit means operatively coupled to said center tapped winding for circulating the energy stored in said tapped inductance during the commutating periods.

11. A new and improved inverter including in combination a pair of silicon controlled rectifiers, a commutating interval current limiting reactor comprised by a center tapped winding interconnecting the pair of silicon controlled rectifiers in series circuit relationship, a first pair of voltage dividing capacitors connected in series circuit relationship and adapted to be connected across a direct current source of electric potential in parallel circuit relationship with the series circuit comprised by the center tapped winding and silicon controlled rectifiers, a pair of commutating capacitors connected in series circuit relationship in parallel with the series circuit comprised by said center tapped winding and silicon controlled rectifiers, and with the voltage dividing capacitors, a second inductance interconnected between the juncture of the commutating capacitors and the center tap on the center tapped winding with a load being adapted to be connected between the center tap on the center tapped winding, and the juncture of the voltage dividing capacitors, said second inductance being of a value to tune the series circuit comprised by the second inductance and either of the commutating capacitors to series resonance at a commutating frequency that is substantially higher than the operating frequency of the inverter, and a respective diode directly connected across each one of said silicon controlled rectifiers in parallel circuit relationship.

12. The combination set forth in claim 11 further characterized by auxiliary circuit means operatively coupled to said center tapped winding for circulating the energy stored in said center tapped winding during the commutating interval.

13. A new and improved inverter including in combination a pair of silicon controlled rectifiers, a center tapped winding interconnecting one set of like electrodes of the pair of silicon controlled rectifiers, the remaining set of like electrodes of the pair of silicon controlled rectifiers being adapted to be directly connected in common to one terminal of a direct current source of electric potential, a commutating interval current limiting reactor interconnected between the center tap of the center tapped winding and the remaining terminal of the source of direct current electric potential, a commutating capacitor and inductance connected in series circuit relationship between the first mentioned set of like electrodes of the silicon controlled rectifiers and in parallel with the center tapped winding, the commutating capacitor and inductance being tuned to series resonance at a commutating frequency substantially higher than the operating frequency of the inverter, and a respective by-pass diode directly connected across each of said silicon controlled rectifiers in parallel circuit relationship.

14. The combination set forth in claim 13 wherein said commutating interval current limiting reactor comprises a third winding, and wherein said inverter circuit is further characterized by means for coupling a load to the center tapped winding, and auxiliary circuit means operatively coupled to said third winding for circulating the energy stored in said third winding during commutating periods.

15. A new and improved inverter including in combination a pair of silicon controlled rectifiers, a commutating interval current limiting reactor comprised by a center-tapped winding interconnecting the pair of silicon controlled rectifiers in series circuit relationship, a pair of voltage-dividing capacitors connected in series circuit relationship across a direct current source of electric potential in parallel circuit relationship with the series circuit comprised by the center-tapped winding and silicon controlled rectifiers, two commutating series circuits with each series circuit being tuned to series resonance at a commutating frequency substantially higher than the operating frequency of the inverter and being formed by a commutating capacitor and a second inductance connected in series circuit relationship, the two series circuits thus formed are in turn connected in series circuit relationship across the direct current source of electric potential in parallel with the series circuit comprised by the center tapped winding and silicon controlled rectifiers, means connecting the juncture of the two commutating series circuits to the center tap point on the center tapped winding with the inverter being adapted to have a load connected between the juncture of the voltage dividing capacitors and the juncture of the series commutating circuits, and a respective diode directly connected across each of said silicon controlled rectifiers in parallel circuit relationship.

16. The combination set forth in claim 15 further characterized by auxiliary circuit means operatively coupled to said center tapped winding for circulating the energy stored in said tapped inductance during the commutating periods.

17. A new and improved multi-phase inverter employing the single-phase inverters of the type set forth in claim 1 wherein the loads of the individual inverters are interconnected to provide a multi-phase output.

18. A new and improved multi-phase inverter comprising three single phase inverters of the type set forth in claim 9 wherein the loads are effectively interconnected between the center taps of the center tapped windings in the first and second inverters, the second and third inverters, and the first and third inverters.

19. A new and improved full wave bridge inverter including in combination two series circuits adapted to be connected in parallel circuit relationship across a direct current source of electric potential, each of said series circuits being comprised by a pair of silicon controlled rectifiers and a center tapped winding interconnecting the pair of silicon controlled rectifiers in series circuit relationship, a commutating capacitor and second inductance interconnected in series circuit relationship between the center taps of the center tapped windings of each of said first mentioned series circuits, the commutating capacitors and second inductance being tuned to series resonance at a commutating frequency substantially higher than the operating frequency of the inverter with the inverter being adapted to have a load connected in parallel with the commutating circuit between the center taps of the first mentioned center tapped winding, a respective diode directly connected across each of the silicon controlled rectifiers in parallel circuit relationship, and auxiliary circuit means operatively coupled to each of said center tapped inductances for circulating the energy stored in said center tapped inductances during the commutating periods.

20. A new and improved full wave bridge inverter including in combination two series circuits adapted to be connected in parallel circuit relationship across a direct current source of electric potential, each of said series circuits being comprised by a pair of silicon controlled rectifiers and a center tapped winding interconnecting the two silicon controlled rectifiers in series circuit relationship, a pair of voltage dividing capacitors connected in series circuit relationship, with the series circuit thus formed being connected in parallel circuit relationship with both said first mentioned series circuits, first and second commutating circuits each comprised by a series connected commutating capacitor and second inductance tuned to series resonance at a commutating frequency substantially higher than the operating frequency of the inverter, one end of said first and second commutating circuits being connected in common to the juncture of the voltage dividing capacitors with the remaining ends of each commutating circuit being connected to the center tap points of respective ones of said center tapped winding, a respective diode directly connected across each one of said silicon controlled rectifiers in parallel circuit relationship, and auxiliary circuit means operatively coupled to each of said center tapped windings for circulating the energy stored in said center tapped winding during the commutating interval.

21. A new and improved full wave bridge inverter circuit including in combination two series circuits adapted to be connected in parallel circuit relationship across a direct current source of electric potential, each of said series circuits being comprised by a pair of silicon controlled rectifiers and a center tapped winding interconnecting the two silicon controlled rectifiers in series circuit relationship, a set of two commutating circuits connected in parallel circuit relationship with said first mentioned two series circuits, each of said sets of commutating circuits comprising two series connected circuits, with each circuit being comprised by a capacitance and a series connected second inductance tuned to series resonance at a commutating frequency that is substantially higher than the operating frequency of the inverter, the center tap of the center tapped winding in one of said first mentioned series circuits being connected to the juncture of the two series connected circuits in one of said sets of commutating circuits, and the center tap of the center tapped winding in the remaining first mentioned series circuit being connected to the juncture of the two series connected circuits in the remaining one of said sets of commutating circuits with a load being adapted to be connected between the center tap points of the center tapped windings in said first mentioned pair of series circuits, a respective diode directly connected across each one of the silicon controlled rectifiers, and auxiliary circuit means operatively coupled to each of said center tapped windings for circulating the energy stored in said center tapped windings during the commutating periods.

22. The combination set forth in claim 20 further characterized by a load interconnected between the center tap points of the two center tapped windings, and gating signal means operatively coupled to the gate electrodes of the silicon controlled rectifiers for phase controlling the gating-on of said silicon controlled rectifiers to thereby control the magnitude of the bridge inverter output.

23. The combination set forth in claim 21 further characterized by a load interconnected between the center tap points of the two center tapped windings, and gating signal means operatively coupled to the gate electrodes of the silicon controlled rectifiers for phase controlling the gating-on of said silicon controlled rectifiers to thereby control the magnitude of the bridge inverter output.

*24. A new and improved power circuit including in combination a pair of gate controlled current switching devices, a commutating interval current limiting reactor interconnected with the pair of gate controlled current switching devices with the circuit thus formed being designed for connection across a source of electric potential, a commutating circuit comprised by at least one commutating capacitor and series connected second inductor operatively connected through at least a portion of the commutating interval current limiting reactor and through alternate ones of the current switching devices during periods of conduction of the same across the source of electric potential whereby the commutating capacitor is charged to a predetermined energy level during periods of conduction of respective ones of said gate controlled current switching devices, and means for gating on the non-conducting one of the gate controlled current switching devices to discharge the commutating capacitor and reverse bias the initially conducting one of said gate controlled current switching devices to turn it off, the series circuit comprised by the commutating capacitor and second inductor being tuned to series resonance at a commutating frequency having a period substantially shorter than the load current conducting periods of the power circuit.*

*25. The combination set forth in claim 24 further characterized by a unidirectional conducting device directly connected across each of the gate controlled current switching devices in reverse polarity parallel circuit relationship for circulating any excess reactive energy of the commutating capacitor during the commutating periods of the gate controlled current switching devices.*

*26. The combination set forth in claim 24 further characterized by auxiliary circuit means operatively coupled to said commutating interval current limiting reactor for circulating the energy stored therein during the commutating period.*

*27. The combination set forth in claim 24 wherein the commutating interval current limiting reactor is a winding which is tapped at its midpoint with the two winding halves being tightly coupled so that equal currents flowing in opposite directions in the winding halves produce ampere-turn effects which cancel each other out.*

*28. The combination set forth in claim 24 further characterized by a load operatively coupled across the source of electric potential through at least one of said gate controlled current switching devices.*

*29. The combination set forth in claim 24 wherein said gate controlled current switching devices comprise silicon controlled rectifiers.*

*30. The combination set forth in claim 24 wherein the gate controlled, current switching devices comprise silicon controlled rectifiers and wherein the commutating interval current limiting reactor is a winding which is tapped at its center point with the two winding halves being tightly coupled so that equal currents flowing in opposite directions in the winding halves produce ampere-turn effects which cancel each other out, and further characterized by auxiliary circuit means operatively coupled to said commutating interval current limiting reactor for circulating any excess energy stored therein during the commutating period, a load operatively coupled across the source of electric potential through at least one of said silicon controlled rectifiers, and a unidirectional conducting device directly connected across each of the silicon controlled rectifiers in reverse polarity, parallel circuit relationship for circulating any excess reactive energy of the commutating capacitor during the commutating periods of the gate controlled devices.*

*31. The combination set forth in claim 24 wherein said gate controlled current switching devices comprise silicon controlled rectifiers, and said unidirectional conducting devices comprise semiconductor diodes.*

*32. An improved power circuit including in combination a pair of conductivity controlled current switching devices, a tapped first linear inductor interconnected with said pair of devices in series circuit relationship across a pair of power supply terminals which are adapted to be connected across a source of electric potential, a load circuit, means operatively coupled in series circuit relationship with at least one of said pair of devices through a part of said tapped first linear inductor for coupling said load circuit across said power supply terminals for circulating load current therethrough, and commutation circuit means comprising at least one commutating capacitor and series connected second linear inductor operatively connected between at least one of said power supply terminals and through said tapped first inductor to said pair of devices for commutating off the devices, the series circuit comprised by the commutating capacitor and second inductor being tuned to series resonance at a commutating frequency having a period which is substantially shorter than the load current conducting periods of said power circuit, one of said pair of current switching devices being adapted to be intermittently conductive for discharging the commutating capacitor through the tapped first inductor and thereby terminating the conduction of the other of said pair of devices.*

*33. The combination set forth in claim 32 further characterized by a unidirectional conducting device directly connected across each of the conductivity controlled current switching devices in reverse polarity parallel circuit relationship for circulating any excess reactive energy of the commutating capacitor during the commutating periods of the conductivity controlled conducting devices.*

*34. The combination set forth in claim 32 further characterized by auxiliary circuit means operatively cou-*

*pled to said tapped first linear inductor for circulating the energy stored therein during the commutating period.*

*35. The combination set forth in claim 32 wherein the tapped first linear inductor is a winding which is tapped at its midpoint with the two winding halves being tightly coupled so that equal currents flowing in opposite directions in the winding halves produce ampere-turn effects which cancel each other out.*

*36. The combination set forth in claim 32 wherein said gate conductivity controlled current switching devices comprise silicon controlled rectifiers.*

*37. The combination set forth in claim 32 wherein the conductivity controlled current switching devices comprise silicon controlled rectifiers and wherein the tapped first linear inductor is a winding which is tapped at its center point with the two winding halves being tightly coupled so that equal currents flowing in opposite directions in the winding halves produce ampere-turn effects which cancel each other out, and further characterized by auxiliary circuit means opertively coupled to said commutating interval current limiting reactor for circulating any excess energy stored therein during the commutating period, unidirectional conducting device directly connected across each of the silicon controlled rectifiers in reverse polarity, parallel circuit relationship for circulating any excess reactive energy of the commutating capacitor during the commutating periods of the gate controlled devices.*

*38. The combination set forth in claim 33 wherein said conductivity controlled current switching devices comprise silicon controlled rectifiers, and said unidirectional conducting devices comprise semiconductor diodes.*

*39. An improved full-wave bridge power circuit including in combination two series circuits connected in parallel circuit relationship across a pair of power supply terminals that in turn are adapted to be connected across a source of electric potential, each of said series circuits being comprised by a pair of conductivity controlled current switching devices and a tapped first linear inductor interconnecting the pair of devices in series circuit relationship, a load circuit interconnecting the tap points of said first inductors, and commutation circuit means comprised by at least one series circuit formed by a commutating capacitor and series connected second linear inductor, said last mentioned series circuit being coupled between said power supply and one of said devices in each pair in its conducting condition through the tap point of the second linear inductor connected to such device for commutating off the same, the series circuit comprised by the commutating capacitor and second inductor being tuned to series resonance at a commutating frequency having a period which is substantially shorter than the load current conducting periods of the power circuit, one of said current switching devices in each pair of series connected devices being intermittently conductive for discharging the commutating capacitor through the tapped first inductor connected thereto and thereby terminating the conduction of the other of said pair of devices.*

*40. A bridge power circuit according to claim 39 wherein the commutation circuit means is comprised by a single series circuit formed by a commutating capacitor and series connected second linear inductor connected in parallel circuit relationship with the load.*

*41. A bridge power circuit according to claim 39 wherein the commutation circuit means is comprised by two sets of series circuits each formed by a commutating capacitor and series connected second linear inductor with each set being connected between the tap point of a respective tapped first inductor and a tapped power source connected across the power supply terminals.*

*42. A bridge power circuit according to claim 39 wherein the commutation circuit means is comprised by four sets of series circuits each formed by a commutating capacitor and series connected second linear inductor with each set being connected in parallel circuit relationship with a respective conductivity controlled current switching device and its series connected winding portion of the tapped first linear inductor connected thereto.*

References Cited

The following references, cited by the Examiner, are of record in the patented file of this patent or the original patent.

UNITED STATES PATENTS

| | | | |
|---|---|---|---|
| 3,263,152 | 7/1966 | Walker | 321—45 |
| 3,010,062 | 11/1961 | Van Emden | 321—18 |
| 3,082,369 | 3/1963 | Landis. | |
| 3,118,105 | 1/1964 | Re'ation et al. | 321—45 |
| 3,120,633 | 2/1964 | Genuit. | |

JOHN F. COUCH, *Primary Examiner.*

W. SHOOP, *Assistant Examiner.*